United States Patent
Furneaux et al.

(10) Patent No.: US 7,699,689 B2
(45) Date of Patent: *Apr. 20, 2010

(54) VENDING MACHINES AND COIN HANDLING APPARATUS

(75) Inventors: David Michael Furneaux, Reading (GB); Bernard Joseph Campbell, Sherfield-on-Loddon (GB)

(73) Assignee: MEI, Inc., West Chester, PA (US)

( * ) Notice: Subject to any disclaimer, the term of this patent is extended or adjusted under 35 U.S.C. 154(b) by 561 days.

This patent is subject to a terminal disclaimer.

(21) Appl. No.: 10/168,726

(22) PCT Filed: Dec. 22, 2000

(86) PCT No.: PCT/GB00/04979

§ 371 (c)(1),
(2), (4) Date: Sep. 17, 2002

(87) PCT Pub. No.: WO01/48704

PCT Pub. Date: Jul. 5, 2001

(65) Prior Publication Data

US 2003/0051970 A1   Mar. 20, 2003

(30) Foreign Application Priority Data

Dec. 23, 1999   (GB) ................................ 9930522.9

(51) Int. Cl.
  *G07D 9/00*   (2006.01)
(52) U.S. Cl. .............................. 453/16; 453/17; 453/61
(58) Field of Classification Search .................. 453/16, 453/17, 58, 61; 313/325; 361/268
See application file for complete search history.

(56) References Cited

U.S. PATENT DOCUMENTS

| | | | | |
|---|---|---|---|---|
| 3,901,367 A | * | 8/1975 | Miyazawa | 194/317 |
| 4,012,588 A | * | 3/1977 | Davis et al. | 178/18.04 |
| 4,223,790 A | * | 9/1980 | Yoshida | 209/590 |
| 4,345,650 A | * | 8/1982 | Wesley | 166/249 |
| 4,590,975 A | | 5/1986 | Credle, Jr. | |
| 4,774,841 A | | 10/1988 | Chadwick | |
| 5,092,816 A | * | 3/1992 | Levasseur | 453/17 |
| 5,492,212 A | * | 2/1996 | Fillod et al. | 194/202 |
| 5,616,865 A | * | 4/1997 | Webster | 73/627 |
| 5,708,223 A | * | 1/1998 | Wyss | 73/865.9 |

(Continued)

FOREIGN PATENT DOCUMENTS

DE    197 14 799    10/1998

(Continued)

OTHER PUBLICATIONS

Illustrated Dictionary of Electronics, by Gibilisco, pub. by McGraw-Hill, 2001, p. 231, ISBN 0-07-137236-9.*

*Primary Examiner*—Jeffrey A Shapiro
(74) *Attorney, Agent, or Firm*—Fish & Richardson P.C.

(57) ABSTRACT

An electrical discharge produces an acoustic impulse, and a reflection of the impulse from the upper coin in a coin stack is sensed so that the level of the coin stack can be determined from the time taken for the reflection to be received. Alternatively, or additionally, the acoustic impulse can be used to detect coin jams, the presence and/or width of a coin store, the state of a coin routing gate or the quantity of a vendible product.

2 Claims, 8 Drawing Sheets

U.S. PATENT DOCUMENTS

| | | | |
|---|---|---|---|
| 5,742,656 A * | 4/1998 | Mikulak et al. | 377/7 |
| 5,755,618 A * | 5/1998 | Mothwurf | 453/17 |
| 5,929,337 A * | 7/1999 | Collins et al. | 73/597 |
| 6,227,058 B1 * | 5/2001 | Tretiakov | 73/861.23 |
| 6,234,023 B1 * | 5/2001 | Collins et al. | 73/597 |
| 6,318,537 B1 * | 11/2001 | Jones et al. | 194/346 |
| 2003/0051970 A1 * | 3/2003 | Furneaux et al. | 194/200 |
| 2004/0079615 A1 * | 4/2004 | Furneaux | 194/215 |

FOREIGN PATENT DOCUMENTS

| | | |
|---|---|---|
| GB | 2139 352 A | 11/1984 |
| GB | 2193 749 A | 11/1987 |
| WO | WO 97/35279 A1 | 9/1997 |

* cited by examiner

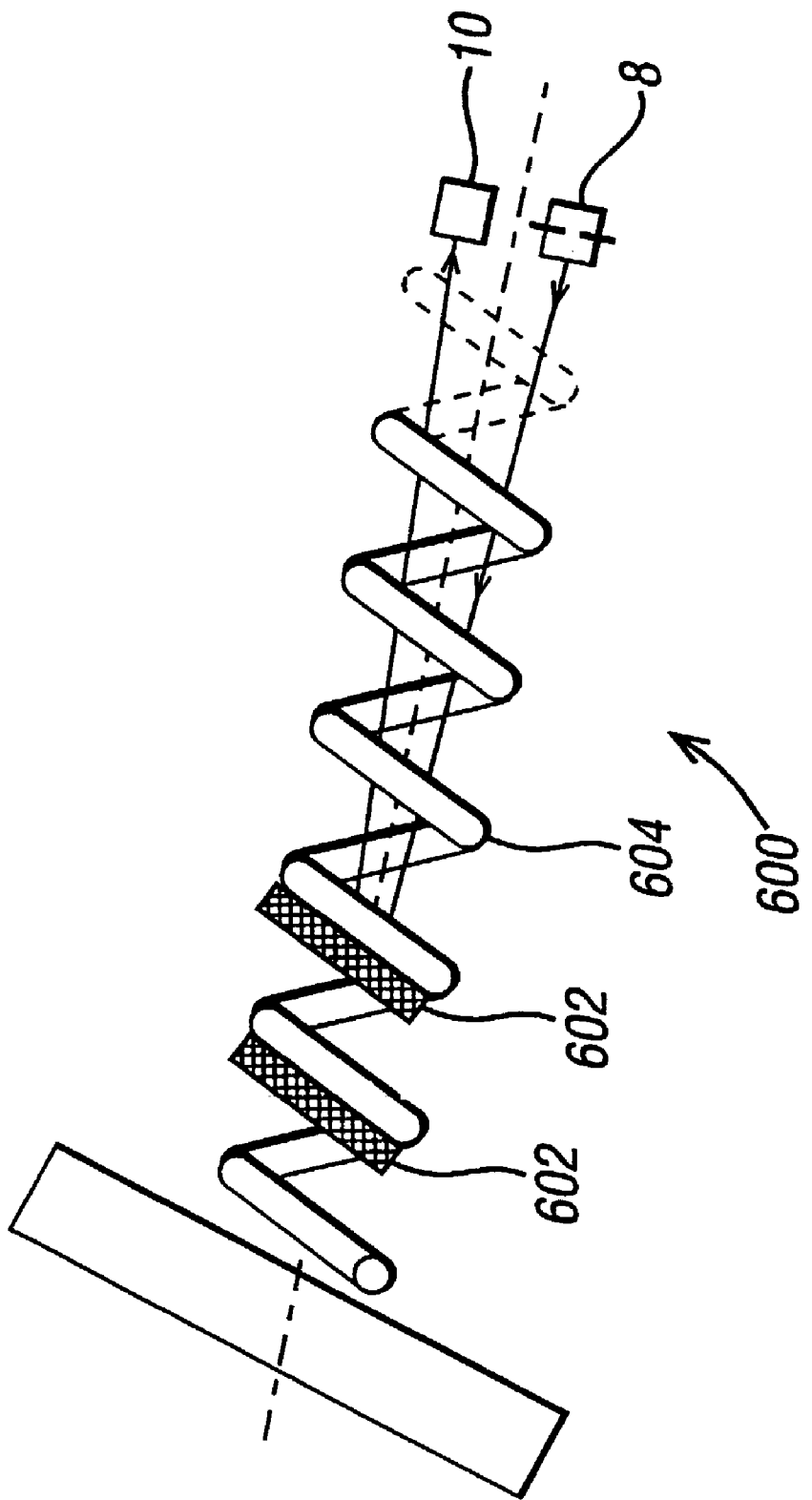

VENDING MACHINES AND COIN HANDLING APPARATUS

This invention relates to vending machines and coin handling apparatus, such as may incorporate validators.

Certain aspects of the invention are of particular relevance to vending machines.

Vending machines typically have to been visited frequently by a routeperson to check that none of the stock items has run out. The visits need to be frequent enough to prevent stock items from running out, resulting in lost sales, but not so frequent as to result in unnecessary effort. This can be difficult to plan, especially as the rate at which items are sold can vary.

Vending machines can develop faults whereby a product which is intended to be vended becomes jammed, and therefore a customer who has paid for an item may find that he does not receive that item. To avoid this consequent loss, it is known to provide vending machines with sensors which determine whether a product has been vended as intended. It is also known to provide a sensor which detects when a product has run out, and in response thereto to inhibit further vends.

According to an aspect of the present invention, there is provided a vending machine which has means for measuring a quantity of a vendible product stored therein. Such an arrangement can be used for multiple purposes. It is possible to determine whether the quantity of the vendible product changes following an intended vend, thereby to confirm that the vend has taken place. If the sensed quantity does not change appropriately, the machine can be caused to attempt again to vend the product, in the hope of clearing a fault or jam. It is further possible to ensure that vends are inhibited if the level is determined to be zero. In a preferred aspect of the invention, however, a signal representing the sensed quantity is transmitted to a remote location, so that it is possible to determine, before a product has run out, that replenishment will soon be required, and a visit from a routeperson can than be arranged.

Although this aspect has been described in the context of measuring the quantity of products available for vending (and these products could be of any type, such as packages, cups, cans, or bulk items of liquid or granular solid), similar advantages can apply to use of the technique for measuring waste products, such as liquid overspill in a waste container, as the techniques will provide advance warning of when a routeperson is required. Another alternative is to measure the quantity of an item being vended (such as liquid in a cup), so as to obtain a more accurate vend than is achieved simply by, e.g. a timing operation.

Various techniques can be used to determine the quantity of a vendible product. However, there is one particularly preferred technique, which is relatively cheap to implement and which is suited for use with many different physical configurations. Consequently, according to a preferred embodiment of the invention, the quantity of a vendible product is determined by generating an acoustic impulse and determining the time taken for a reflection of the impulse from a surface to reach a receiver. As described below, a technique like this has previously been described (in GB-A-2190749) for measuring the quantity of coins in a storage tube. There is further explained below a particularly advantageous improvement which has been applied to the technique, and which is of benefit when used in a vending machine according to the present aspect of the invention.

Other aspects of the invention are of particular relevance to coin validators.

Coin validators commonly include many sensors, for example for detecting the properties of inserted coins, detecting the presence of coins at various locations within the coin path, detecting the level of coins within coin stores, etc. Many attempts have been made to produce sensors which are more effective, more compact and/or less expensive.

One example is shown in GB-A-2190749. The disclosed arrangement monitors the level of coins within a coin tube by directing a train of ultrasonic pulses towards the top of the stack and measuring the time between the emitted and reflected pulses. Such an arrangement has the advantage of providing an indication of the absolute level of coins, rather than merely an indication of whether or not the level has exceeded a certain threshold, as is the case with many common level sensors. However, the described arrangement suffers from a number of disadvantages. It is difficult to construct, because the ultrasonic transducer is a resonant structure and therefore produces ringing. Any damping used to reduce this ringing will also reduce the power output, leading to potential noise problems. Furthermore, if a substantial proportion of the transducer output is coupled into the surrounding structure, this can result in saturation of the receiving microphone. The transducer has to be spaced by a large distance from the stack of coins, because otherwise the microprocessor will detect the reflected pulse before it has ceased detecting the emitted pulse, so that the overall structure is large, in addition to being difficult to assemble.

It would be desirable to mitigate at least some of these problems.

It would be desirable in addition to provide simple and cost-effective techniques for detecting various aspects of the configuration of a coin validator, so that faults and jams can be sensed or avoided.

According to a further aspect of the invention, a coin handling apparatus is provided with an electric spark generator. In order to detect the location or presence of a surface, the spark generator is actuated to produce a pressure wave, and the time taken for the pressure wave to reach a receiver is detected.

In the embodiments described below, the pressure wave is reflected from the surface (assuming the latter is present) to a microphone. The sensing of the reflection by the microphone provides an indication of the presence of the surface and the transit time provides an indication of the location of the surface. The spark generates a powerful pressure wave with a very steep rise-time and a very brief duration. The steep rise time provides a very accurate result as compared with, for example, the arrangement of GB-A-2190749, in which the relatively shallow rise time means that the calculation of the surface location from the sensing of the reflected pulse will be amplitude dependent and therefore inaccurate. The short duration of the pulse allows the spark generator to be located close to the surface being detected without running the risk of the emitted pressure wave being detected contemporaneously with the reflected wave.

Other aspects of the invention are directed to the idea of using acoustic impulses for detecting the configuration of a coin validator; thus, for example, an acoustic impulse can be used to detect whether or not a coin store is present or whether or not a coin routing gate is in a predetermined position, by determining whether the reflected acoustic impulse is received within a particular time period. An acoustic impulse could also be used for detecting a dimension of a coin store (for example the width of a coin tube) by sensing how long it takes for the impulse to reach the receiver after having been reflected off a wall of the store. The presence of a jammed coin in a particular orientation will also be detected as a result of interference with the acoustic impulse. All these possibilities are made more practicable by the use of particularly short impulses, preferably less than 100 microsecond and more preferably less than 25 microseconds, such as may be generated by an electric spark.

Various embodiments of the invention will now be described by way of example with reference to the accompanying drawings, in which:

FIG. 1 schematically shows a coin handling apparatus in accordance with the invention;

FIG. 8 is a plan view of a product dispenser in another vending machine according to the invention.

Figure 1:
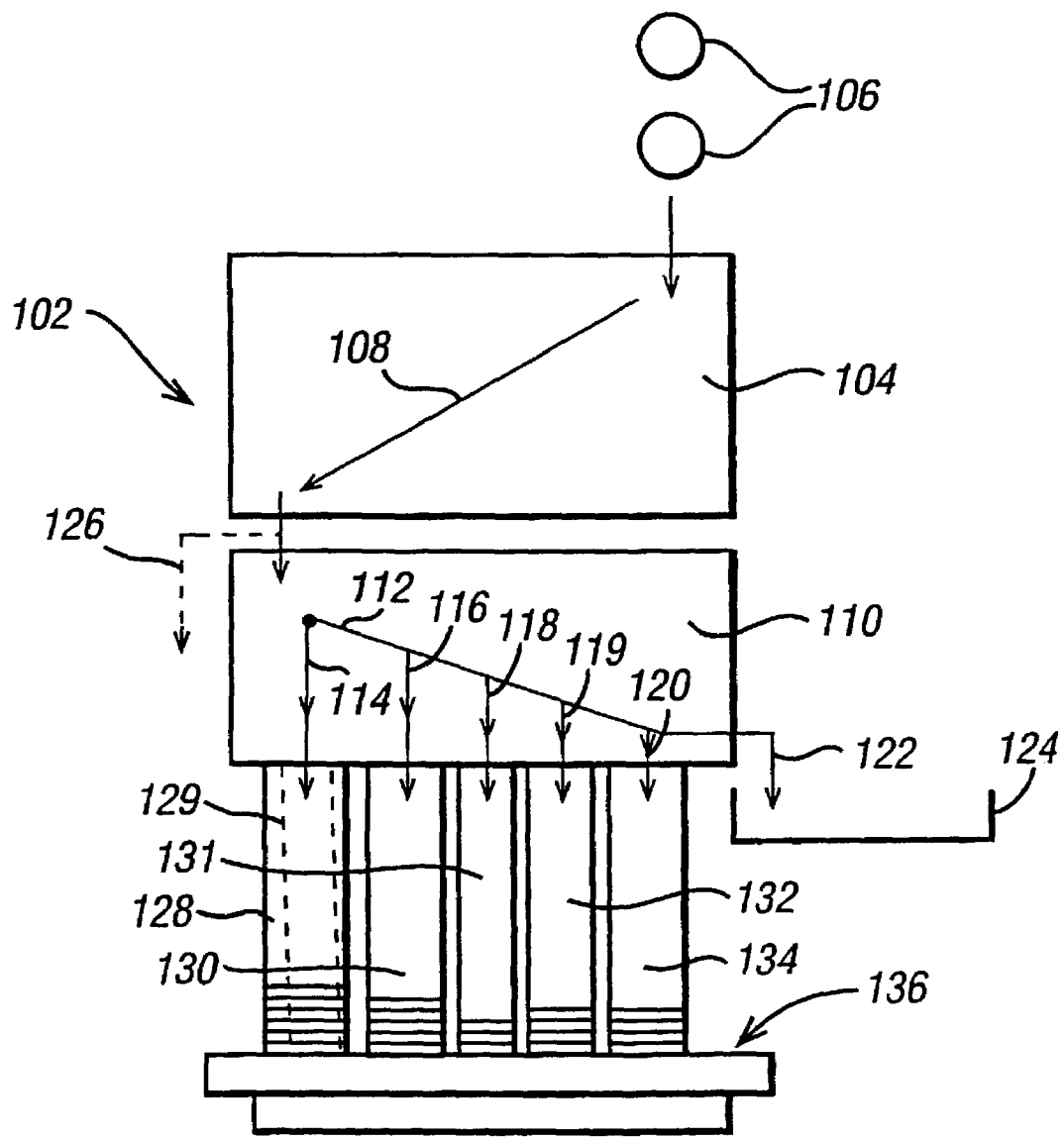

Referring to FIG. 1, a coin handling apparatus 102 includes a coin validator 104 for receiving coins as indicated at 106. During the passage of the coins 106 along a path 108 in the validator 104, the validator provides signals indicating whether the coins are acceptable, and if so the denomination of the coins.

Acceptable coins then enter a coin separator 110, which has a number of gates (not shown) controlled by the circuitry of the apparatus for selectively diverting the coins from a main path 112 into any of a number of further paths 114, 116, 118, 119 and 120, or allowing the coins to proceed along the path 112 to a path 122 leading to a cashbox 124. If the coins are unacceptable, instead of entering the separator 110 they are led straight to a reject slot via a path 126.

Each of the paths 114, 116, 118, 119 and 120 leads to a respective one of five coin tubes or containers 128, 130, 131, 132 and 134. Each of these containers is arranged to store a vertical stack of coins of a particular denomination. Although five containers are shown, any number may be provided.

A dispenser indicated schematically at 136 is operable to dispense coins from selected ones of the containers when change is to be given by the apparatus.

Figure 2:
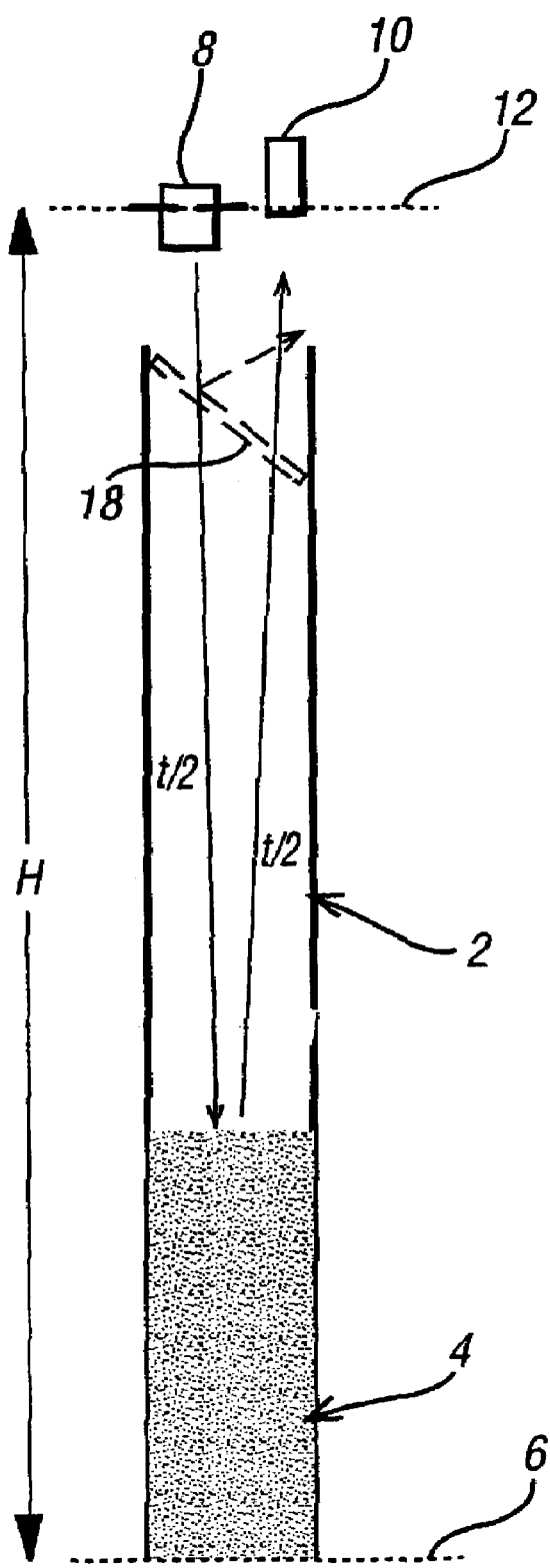
FIG. 2 is a schematic view of a coin tube of the apparatus of FIG. 1, which has associated therewith a level sensor operating in accordance with a method of the present invention.

Referring to FIG. 2, this shows a representative coin tube 2 corresponding to any one of the containers 128, 130, 131, 132 and 134. The coin tube 2 has stored therein coins 4 in a face-to-face vertical stack, resting on a base the level of which is indicated by datum line 6. An acoustic impulse generator, in the form of a spark gap 8, and a microphone 10, are located above the coin tube 2. In this embodiment, both the spark gap 8 and the microphone 10 are located on a sensor datum 12 located at a height H above the base 6 of the coin stack (although it would be possible for them to be mounted at different heights).

In order to detect the level of coins in the tube 2, a control circuit causes the triggering of a spark, and the time taken for the resulting acoustic impulse to be reflected off the uppermost coin in the stack 4 and travel to the microphone 10 is measured. Assuming that the time taken is t, and the speed of sound is V, then the stack height is given by $S = H - Vt/2$.

$V = 331.29 \times \sqrt{(T/273)}$ m/s, where T is the absolute temperature. Accurate results can be obtained by assuming an average temperature; however, in the preferred embodiment, a temperature sensor is used to provide even greater accuracy. This assumes that the height H is known to sufficient accuracy, which can be achieved either by control of manufacturing tolerances, or by an initial calibration operation in which the reflection time t is measured with the coin tube empty and then H is calculated to be equal to $Vt/2$.

Figure 3A:
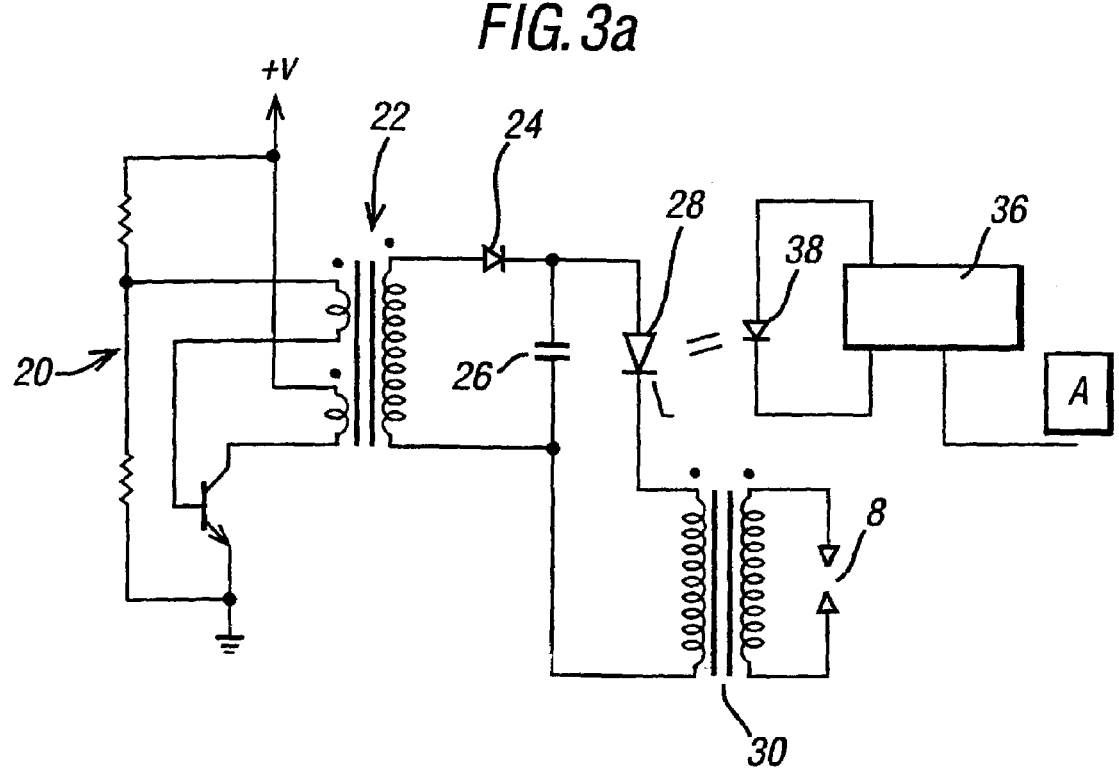
FIGS. 3a and 3b are diagrams of a circuit for operating the level sensor.

Referring to FIG. 3a, an oscillator 20 is coupled to an inverter transformer 22. The output of this is rectified by a diode 24 and the DC output stored on a capacitor 26, providing approximately 250 volts DC. This voltage is coupled, via a thyristor 28, across a step up transformer 30. Upon triggering of the thyristor 28, a voltage of approximately 9 kV is generated at the output of step up transformer 30, which is connected across the spark gap 8. This produces a powerful spark having a rise time of less than 20 microseconds. The power of the spark is coupled directly to the air, rather than to the surrounding structure, thus resulting in a very efficient and brief acoustic impulse.

The thyristor is triggered at regular intervals, e.g. 50 Hz, by a spark rate generator 36, which is coupled to the thyristor by an optical interface including an LED 38.

Figure 3B:
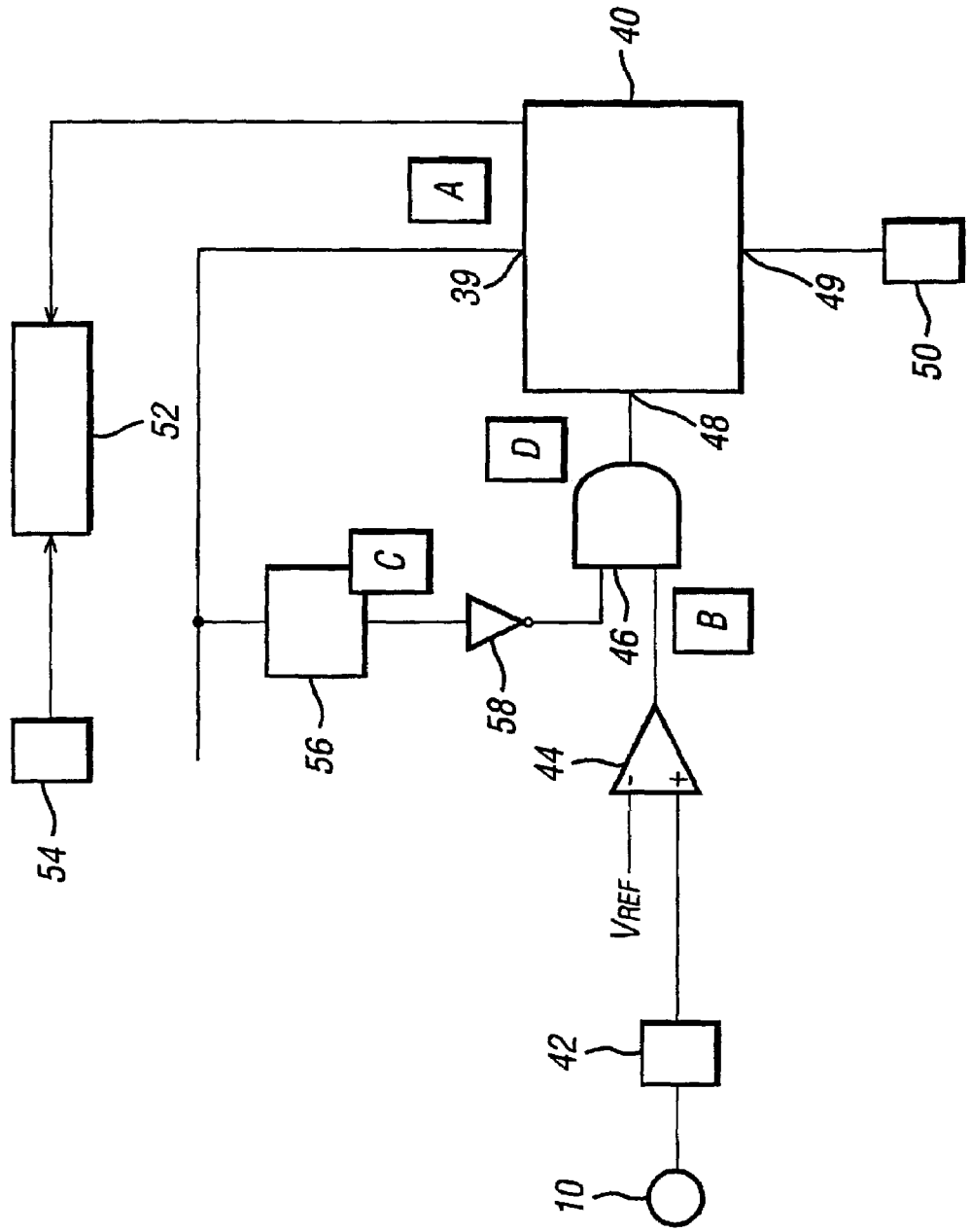

The spark rate generator 36 also has an output A which is delivered to the detection circuit shown in FIG. 3b. This output A carries a single pulse each time a spark is generated. This pulse is applied to a start input 39 to start a counter 40.

The output of the microphone 10 is delivered through an amplifier 42 to a comparator 44. The comparator output rises whenever the microphone detects a sufficiently loud signal, such that the amplifier output exceeds a threshold $V_{REF}$. The rising comparator output is applied, via an AND gate 46 to a stop input 48 of the counter 40. The clock input 49 of the counter 40 is coupled to a 10 MHz clock 50. Accordingly, the counter counts for the time between the spark being generated and the reflected impulse being received by the microphone 10. A processor 52 takes the output of the counter 40, and the output of a temperature sensor 54, in order to calculate the stack height S. The temperature sensor 54 could be a discrete sensor, e.g. a thermistor, or could be an output derived from a sensor used for other purposes, e.g. an electromagnetic sensor used to measure coin properties, in which case the sensor output when no coin is present could be used to indicate temperature.

Figure 4:
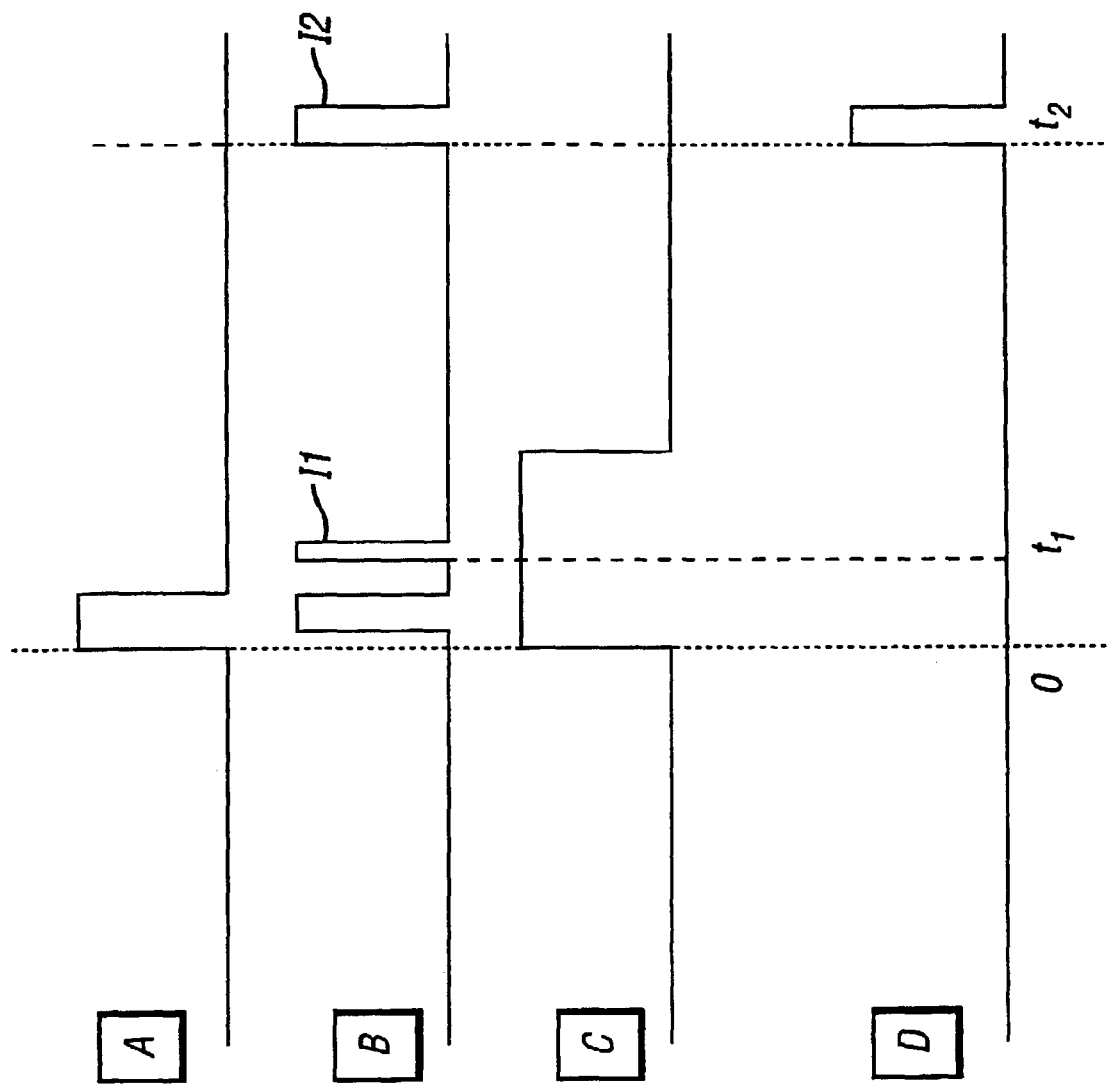
FIG. 4 is a diagram of waveforms appearing in the circuit of FIGS. 3a and 3b.

Referring additionally to FIG. 4, the waveform A represents the pulse sent to the counter 40 by the spark rate generator 36. Waveform B shows the output of the comparator 42. It will be noted that the microphone detects pulses at around the time the spark is generated. The microphone will directly detect the acoustic impulse from the spark gap. Also, because the spark is so powerful, it will create a degree of ringing in the associated structure, even though a very small proportion of the power is coupled to the structure. This may create one or more additional vibrations which are picked up by the microphone 10.

In order to stop these initial pulses from interfering with the operation of the counter 40, a delay circuit 56 is provided to generate a blanking pulse shown at C in FIG. 4. This lasts for approximately 150 microseconds from the beginning of the spark trigger pulse shown at A in FIG. 4, and is sufficiently long to encompass any of the initial pulses sensed by the microphone. The pulse C is applied by an inverter 58 to another input of the AND gate 46, so that no output from the comparator 44 is transferred to the stop input of the counter while the blanking pulse C exists.

In a modified arrangement, the circuit is operable to take two time measurements, t1 and t2, which as indicated in FIG. 4 represent respectively the first acoustic impulse I1 detected after the spark pulse has been emitted, and the first acoustic impulse I2 detected after a predetermined blanking period, which can correspond to the period C of FIG. 4. There is a predetermined, known distance D associated with the first of these impulses, I1. For example, this may be the distance between the spark generator 8 and the microphone 10. Alternatively, there may be a reflective surface at a fixed, known position, the distance D being the sum of the distance from the spark generator to the reflective surface and from the reflective surface to the microphone.

Using such an arrangement, the coin level can be calculated by determining the distance L from the spark generator to the top of the coin stack and then from the top of the stack to the receiver, using the relationship: $L/D=t2/t1$.

This provides an accurate indication of level without requiring a temperature measurement, because temperature influences effect t1 and t2 correspondingly and therefore cancel out.

The need to know the dimension D can be avoided by appropriate calibration operations.

In the arrangements described above, instead of calculating the position of the top of the stack, the position can be determined by use of a look-up table addressed using the time measurement or measurements.

The spark generator may be continuously activated at a desired rate throughout a period when measurements are being made. In order to improve resolution, the processor 52 preferably takes a plurality of measurements from the counter 40 and averages them.

Alternatively or additionally, the spark rate generator 36 may be responsive to a signal from a validation circuit (not shown) which indicates that a coin is being routed to the coin store 2. In response to this, a first spark is generated in order to measure the level of coins in the tube and, at a predetermined delay period later, a second spark is generated to take a further measurement. These measurements are compared, and if the difference does not represent an additional thickness corresponding to a single coin, an error signal is generated. Alternatively, or additionally, measurements made before and after a coin dispensing operation could be compared. In these embodiments, the measurements are event-driven.

In a preferred version of the event-driven embodiments, the spark rate generator 36 enabled for a predetermined period each time a measurement is made. This enables a plurality of readings to be taken and averaged to form each measurement.

Experiments suggest that, assuming a coin set wherein the thinnest coin has a thickness of 1.75 mm, assuming no temperature compensation is used and there is a possible 10° C. variation in temperature, it is possible to obtain an accuracy which corresponds to half the thickness of a coin (with a level of 29 coins). However, the error is effectively eliminated by temperature compensation. In a practical arrangement, it is possible, without undue effort, to confine variations due to mechanical tolerances to 25% of the thickness of the thinnest coin. It is also found that because of the fast rise time of the acoustic impulse, it is possible to measure a reflection time to 0.1 microseconds resolution. By averaging 10 readings, it is found that a resolution equating to approximately 0.18 mm is obtained.

Accordingly, using the teachings of the invention, a measurement resolution which is better than the thickness of a single coin is readily achievable. This compares with the arrangement in GB-A-2190749, in which experiments suggest that the rise time of the acoustic impulse is likely to be of the order of 250 microseconds, and the overall time of the impulse possibly in the order of 1.5 milliseconds. Furthermore, if the transducer is damped to reduce the pulse width sufficiently, the power of the impulse is so low that noise problems present themselves. Accordingly, for practical purposes the resolution of a single coin would be very difficult, if not impossible, to achieve.

Figure 5:
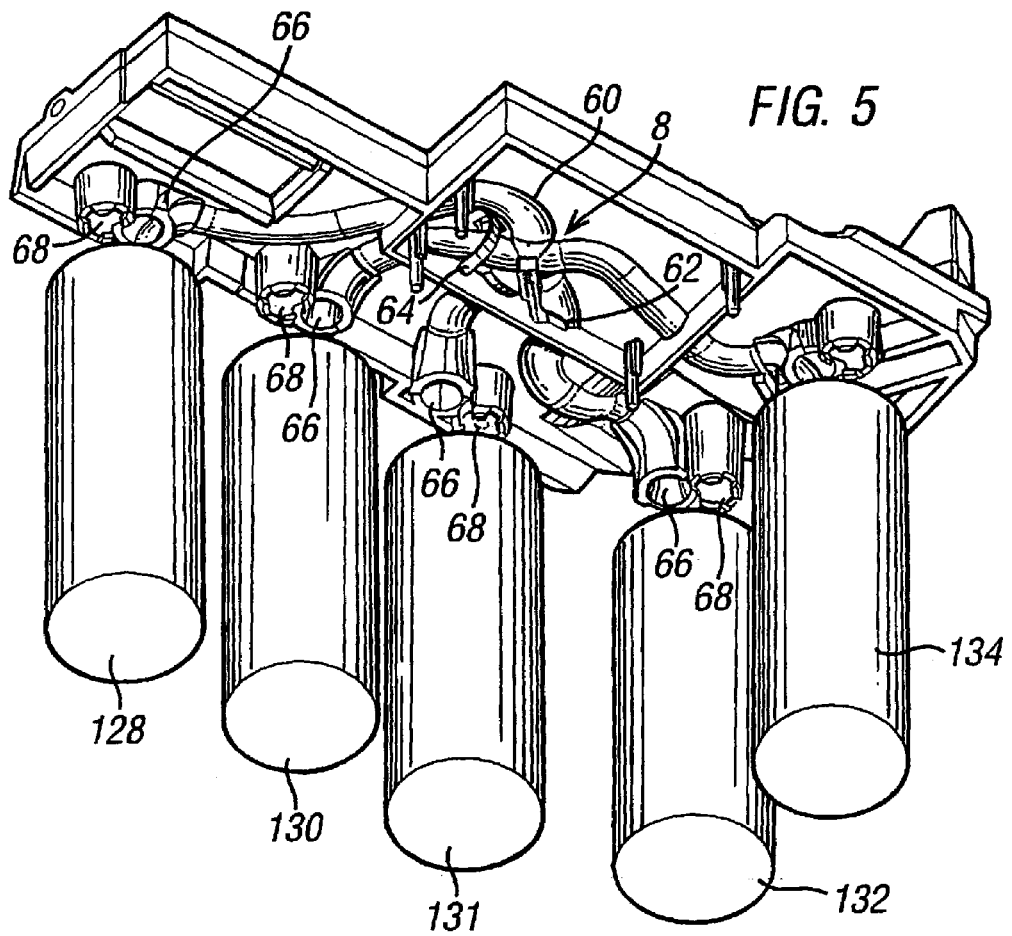
FIG. 5 is a perspective view of a coin storage section of the apparatus of FIG. 1.

FIG. 5 illustrates a practical arrangement which operates in accordance with the teachings of the present invention. In this case, there is a single spark generator 8 for generating acoustic impulses for detecting the stack levels in all of the containers 128, 130, 131, 132 and 134. The acoustic impulses are conveyed to the containers using a manifold 60. The spark generator 8 has terminals 62 and 64 leading to a pair of wires (not shown) whose ends are separated by approximately 3 millimetres. The manifold 80 comprises 3 millimetre diameter tubes extending from the spark region to locations above the containers. The end of each tube is flared to increase the internal diameter from 3 millimetres to 6 millimetres, providing improved impedance matching and acoustic impulse transmission characteristics. Each flared end 66 is located immediately adjacent a respective microphone 68, with the centre line between the flared end 66 and the microphone 68 being located over the centre of the respective one of the containers 128, 130, 131, 132 and 134. This helps to avoid unwanted acoustic reflections.

The use of the manifold 60 for conveying the acoustic impulse to respective areas has been found to reduce significantly the cost of and space occupied by the device according to the present invention. The microphones can be successively switched into and out of circuit so that the same detection arrangement can be used for all of the level sensors.

Referring again to FIG. 1, each of the containers 128, 130, 131, 132 and 134 is preferably removable and replaceable by a container of different diameter. The containers may, if desired, be located in a single cassette which is itself removable from the apparatus 102 to facilitate removal and replacement of individual containers.

Preferably the mounting arrangements for the individual containers are such that the centre of the top of each container is always located at a predetermined position, irrespective of the diameter of the container. Thus, if for example the container 128 were to be replaced by a container of different diameter, as indicated at 129 in broken lines, the container, the end 66 of the manifold and the microphone 68 would still have the appropriate relative positions for correct operation.

As explained further below, it is possible to apply the techniques of the invention for detecting parameters other than the level of coins in a coin tube. It has been determined that similar techniques can be used to advantage for other purposes, and that this is made particularly practicable if it is possible to produce acoustic impulses which have a very fast rise time and short duration, because this enables the fitting of the detector into a compact coin validator. Accordingly, an electrical arc discharge arrangement such as that mentioned above is particularly desirable. However, it may be possible to use other arrangements, for example, a damped piezoelectric transducer which is energised by a brief, high voltage, although it is envisaged that this would be significantly more difficult to achieve.

Separate acoustic impulse generators may be provided for different purposes in the coin validator. However, in a particularly preferred embodiment of the invention, generated acoustic impulses are used for multiple purposes. This could be achieved by having several different microphones at predetermined positions so as to detect respective reflections from respective surfaces. Alternatively, as in the arrangement described in the following paragraph, the same generator and microphone can be used for more than one purpose, given a suitable arrangement for analysing the output of the detecting circuitry.

Referring again to FIG. 2, the invention could be used for detecting a coin jam. For example, if a coin is jammed in the position shown in phantom at 18, the reflected impulse from the spark gap may be directed away from the microphone, possibly into the side wall of the coin tube. Alternatively, the reflection may have reached the microphone during the blanking period shown at C in FIG. 4. Therefore, in the preferred embodiment, in order to detect such a jam, the processor 52 is arranged to determine when the count reached by the counter 40 exceeds a particular threshold, which indicates that no appropriate reflection has been received by the microphone. In response thereto, the processor generates an error signal.

A similar effect is produced also if the coin tube 2 is not present. Accordingly, even if there is no possibility of a jam in the coin tube, the processor may be arranged to generate an error signal if no reflected impulse is sensed by the microphone within a predetermined interval following the generation of the spark.

Figure 6A:
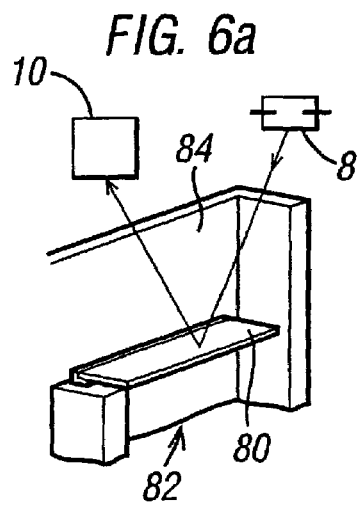
FIGS. 6a and 6b are schematic diagrams showing various configurations of a coin validator that could be detected using the techniques of the present invention.

Referring to FIG. 6a, an acoustic signal may also be used to determine whether a gate 80 is in a first position, in which it projects into a channel 82 forming a coin path, or whether the gate has been withdrawn behind the rear wall 84 of the path.

Figure 6B:
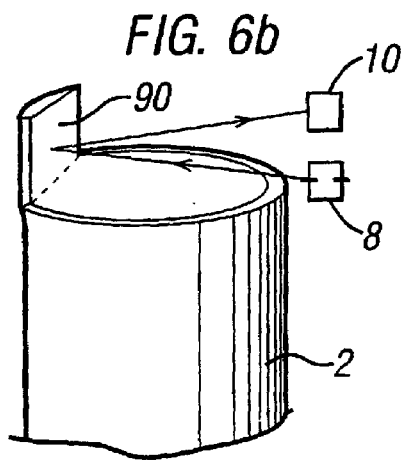

Referring to FIG. 6b, an acoustic impulse may also be used to determine the width of a coin tube 2, possibly by reflecting the acoustic impulse off an upwardly projecting extension 90 of the tube. This procedure could be used for automatically configuring the coin validator so that coins of the correct size are directed to that coin tube. In these circumstances the same sensor may be used to detect the presence of the coin tube, or of a cassette containing this and other coin tubes.

The techniques of the invention could also be used for determining the level of coins in a cashbox, even when these are disposed in a disordered manner. In these circumstances, it may be desirable to use two or more level sensors, and/or the arrangement may be such that the sensor is intended to indicate only when the level exceeds the predetermined threshold.

It should be noted that the techniques of the invention could be used exclusively for purposes other than coin level sensing.

Figure 7:
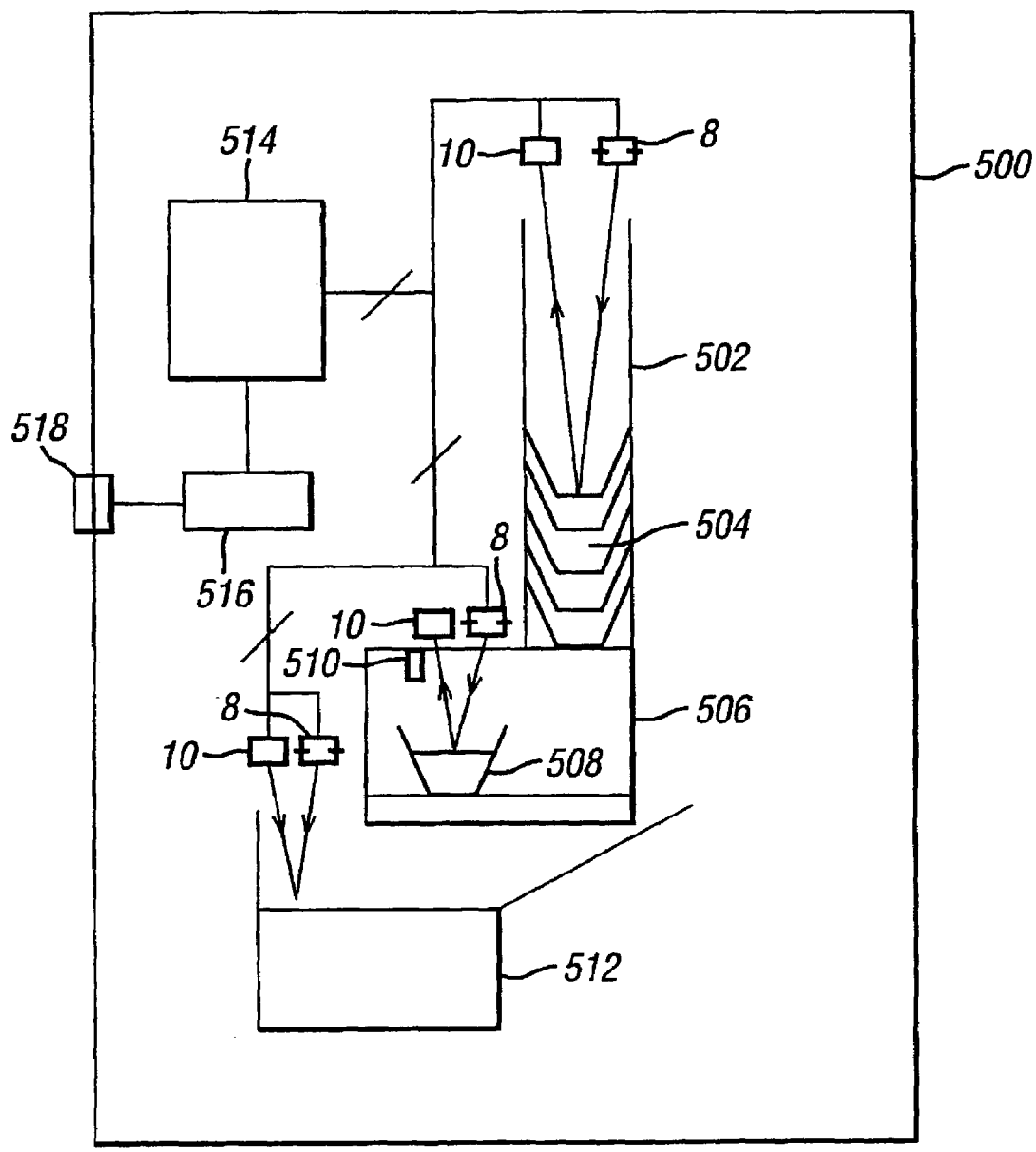
FIG. 7 is a schematic view of a vending machine according to the invention.

Referring to FIG. 7, this shows schematically a vending machine 500 in accordance with the invention. The vending machine 500 is a hot drinks dispenser. A cup store 502 stores cups in a stack 504, from which the bottommost cup can be delivered to a filling compartment 506, as indicated at 508. Hot water is then fed to the cup 508 via a spout 510. Any spilled liquid drains into an overspill container 512.

The machine has three pairs of acoustic impulse transmitter/receivers 8, 10 forming respective level sensors, all coupled to a central controller 514. Each is structured like the level sensor of FIG. 2. The controller 514 includes a control circuit like that of FIGS. 3a and 3b, and is arranged to couple the control circuit to each level sensor in turn.

The level sensors are arranged to measure (a) the number of cups in the cup store 502, (b) the level of liquid dispensed into a cup 508 and (c) the level of liquid in the overspill container 512. The controller is coupled to a modem 516, which is itself connected to a socket 518 for receiving a standard telephone cable. The arrangement is such that whenever the measured level of the cups in the store 502 falls below a predetermined level, and whenever the level in the overspill container 512 exceeds a predetermined level, the controller 514 uses the modem 516 to communicate with a remote location to advise that servicing will soon be required. As an alternative, the remote location can be arranged to poll the vending machine regularly, to determine the levels in the cup store 502 and the overspill container 512.

The controller 514 is arranged to terminate the dispensing of liquid to the cup 508 if the level of the liquid therein exceeds a predetermined value.

The cups may be pre-filled with appropriate ingredients. Alternatively, there may be a separate store for the ingredients, in which case a further level sensor may be provided for this store.

It is not necessary for all these sensors to be provided. If more than one sensor is provided, it may be possible for them to use a common acoustic pulse generator 8. Although it is desirable for the sensors to use electric arc discharges to produce the acoustic impulse, this is not essential, especially if more room is available and/or less accuracy is required.

FIG. 8 shows a product dispenser 600 of a further vending machine according to the invention. This is of generally known form, wherein individual products 602 are disposed in respective turns of a helical structure 604. By rotating the helical structure 604 once about its axis, all products are moved towards an aperture 606, and the endmost product falls out of the structure into the aperture.

A level sensor incorporating an electric arc discharge device 8 and a receiver 10 are provided. The acoustic impulse from the arc travels along the axis of the helical structure 604, and is reflected to the receiver 10 by the last product held in the structure, so the time of receipt of the reflected impulse represents the number of products stored in the helix. This arrangement can be controlled and used as the arrangements described above.

In the arrangements of FIGS. 7 and 8, if it is detected that the level of cups or products has decreased to zero, further vending is inhibited, and if it is detected that the level has not decreased appropriately after a vend has been instructed, a further attempt at a vend is made.

The invention claimed is:

1. A coin handling apparatus comprising a plurality of coin stores and a level detector for detecting a level of coins in a respective one of the stores, the level detector comprising means for determining the level from the time at which an acoustic impulse is determined to have been reflected by a surface whose location is indicative of the level, wherein the level detector further comprises means for generating an electric spark and the acoustic pulse is produced by the electric spark, the apparatus comprising a manifold for directing acoustic impulses from the electric spark generating means to the respective stores to enable detection of the levels of coins in the stores.

2. A coin handling apparatus as claimed in claim 1, wherein each store comprises a respective coin tube in which coins are stored in a stack, the apparatus having mounting means for supporting the coin tube in such a way as to allow replacement of the coin tube by a tube for accommodating coins of different diameter, the mounting means being such as to cause the center of the tube mouth to have a predetermined location irrespective of which tube is supported thereby.

\* \* \* \* \*